2,911,359

DESULFURIZATION PROCESS AND CATALYST

Rowland C. Hansford, Fullerton, Calif., assignor to Union Oil Company of California, Los Angeles, Calif., a corporation of California No Drawing. Application April 30, 1956
Serial No. 581,266

9 Claims. (Cl. 208—213)

This invention relates to catalysts, and catalytic processes for treating hydrocarbons or hydrocarbon mixtures. More particularly, the invention relates to certain novel magnesia-promoted vanadium oxide-alumina catalysts, and to the use thereof for the catalytic hydrofining of hydrocarbons, especially to remove non-hydrocarbon components, as for example sulfur compounds, nitrogen compounds, oxygen compounds and the like. More specifically, the novel catalysts comprise a minor proportion of vanadium oxide supported on a carrier which is predominantly alumina, the vanadium component being promoted by the addition of a small amount of magnesium oxide.

The catalytic hydrodesulfurization, or hydrofining, of mineral oils is in general a well known process, and a great variety of catalysts have been proposed for use in such processes. The primary requisites for such catalysts are that they should exhibit a high activity for the hydrogenation and decomposition of sulfur compounds, nitrogen compounds, and/or oxygen compounds, and minimum tendency to cause the scission of carbon to carbon bonds, resulting in the production of light gases and coke. It is known that most of the transitional metal oxides and sulfides, which are not poisoned by sulfur, possess more or less of such activity. Perhaps the best known and most active of such catalysts is cobalt molybdate supported on alumina. Vanadia-alumina catalysts are active for hydrodesulfurization, but are much less active than those of the cobalt molybdate type. Higher temperatures and much lower space velocities are required with unpromoted vanadia catalysts to produce a degree of desulfurization comparable to that obtained with cobalt molybdate catalysts. Cobalt molybdate catalysts however are fairly expensive, and a cheaper catalyst of comparable activity would be highly desirable.

It has now been found that small amounts of magnesia added to vanadia-alumina catalysts will increase the hydrodesulfurization activity to a level comparable to that of cobalt molybdate catalysts. In addition, less degradation of the mineral oil fraction undergoing desulfurization occurs with the magnesia-promoted vanadia catalyst than occurs with a non-promoted vanadia-alumina catalyst. Hence the addition of magnesia not only promotes the desulfurization activity of vanadia, but also decreases the cracking tendencies thereof.

The principal object of this invention therefore is to provide more economical desulfurization catalysts. A broader object is to provide effective catalysts for desulfurizing mineral oil fractions without causing deleterious cracking to occur. Other objects will be apparent from the more detailed description which follows.

The vanadia and magnesia components of the present catalysts are supported on carriers which are predominantly alumina. Such carriers may include however minor proportions of other components such as silica, zirconia, titania, beryllia and the like, which are found to render the catalyst more resistant to thermal deactivation. These latter materials may be employed in proportions ranging from about 2–20% by weight of the alumina. A particularly suitable carrier comprises coprecipitated alumina-silica gel, containing between about 5% and 15% by weight of silica. Such a composite carrier may be prepared for example by passing carbon dioxide through an aqueous solution of sodium silicate and sodium aluminate. The wet gel is then filtered, dried and activated at temperatures from about 500°–1500° F.

Other forms of alumina may also be employed as for example heat treated bauxite, bauxite impregnated with alumina gel, natural clays containing substantial proportions of alumina, and the like.

The catalyst should contain between about 3% and 25% by weight of $V_2O_5$, and preferably between about 5% and 15% thereof. The vanadia may be added to the carrier in any desired manner, as for example by coprecipitation during formation of the alumina gel, impregnation of the wet, hydrous alumina gel, impregnation of the calcined adsorbent alumina gel, or less preferably by triturating the dry $V_2O_5$ with a powdered alumina gel followed by compressing the mixture into tablets. The preferred method consists in impregnating the adsorbent carrier with an aqueous solution of a vanadium salt which may be decomposed to $V_2O_5$ upon heating, either in an inert atmosphere, in the presence of oxygen, or in the presence of hydrogen. Such salts include ammonium metavanadate, vanadyl sulfate, vanadium tribromide, sodium metavanadate, or the like. Also, ammonium sulfide solutions of vanadium sulfides may be employed. It is preferable to employ compounds of vanadium which, upon calcining, will decompose to $V_2O_5$ without leaving unwanted ions in the catalysts, as for example sodium, sulfate, or halogen ions. Sodium ions in particular are sometimes difficult to remove entirely, and their effect on the catalyst activity is very detrimental.

Following the incorporation of vanadium, as by impregnation, the composite is then dried and calcined by heating at temperatures between about 500° and 1500° F. for 2–24 hours. The preferred method of adding magnesia is by impregnation of the carrier, or the vanadia-impregnated carrier with a soluble magnesium compound, as for example magnesium acetate, magnesium formate, magnesium nitrate, magnesium sulfate or the like. Here again it is preferable to use salts which will decompose on heating to yield magnesium oxide without an extraneous ion such as sulfate or halogen. Suitable proportions of magnesium oxide may range between about 0.1% and 5% by weight, preferably between about 0.5% and 2%. The atomic ratio of magnesium to vanadium in the final catalyst should range between about 0.05 and 1.0, preferably between about 0.2 and 0.5.

Another convenient method of adding the magnesia comprises coprecipitating magnesium hydroxide along with the initial precipitation of alumina gel. This may be accomplished for example by adding alkali, e.g. sodium hydroxide, to a mixture of aluminum nitrate and magnesium nitrate in the proper mole ratios. Following coprecipitation, the wet co-gel is then washed, dried and impregnated with the vanadium solution, followed by drying and calcining to activate the catalyst.

Any other method for preparing intimately admixed vanadia and magnesia dispersed within the carrier structure may be employed. In all cases it is preferable to obtain a molecular subdivision of the components within the carrier.

The method of employing the catalyst is substantially similar to conventional catalyst contacting procedures for desulfurization. This generally involves placing the activated catalyst, in the form of compressed tablets, granules, extruded pellets or the like, which may range in size from about $1/16''$ to $1/2''$ in average diameter, in a suitable vessel and passing the feedstock to be treated through the catalyst bed at temperatures between about 600° and 900° F. Hydrogen is employed in ratios ranging between about 50 and 5000 s.c.f. per barrel of feed. Pressures ranging from atmospheric to about 5000 p.s.i.g. may be employed. Space velocities of about 0.5 to 20 volumes of liquid feed per volume of catalyst per hour are normally employed. The preferred conditions for treating gasoline boiling range feedstocks comprise temperatures between about 650° and 800° F., pressures between about 50 and 2000 p.s.i.g., hydrogen rates between about 200 and 2000 s.c.f. per barrel of feed, and liquid hourly space velocities between about 1 and 8. For treating higher boiling feedstocks, the preferred conditions should be somewhat less severe to minimize hydrocarbon cracking tendencies. The treatment in the case of low-boiling stocks such as naphthas will generally be predominantly in the vapor phase, though not necessarily so, and in the case of higher boiling stocks such as kerosenes, fuel oils, gas oils and the like the treatment will normally be mixed phase, i.e. both a liquid phase and a vapor phase are present.

Following the contacting with the catalyst, the products are condensed to recover the desulfurized liquid hydrocarbon, and the hydrogen rich off-gases are recycled, with or without intervening purification to remove hydrogen sulfide, ammonia, and other impurities.

After the catalyst has been on-stream for a substantial length of time, a gradual decline in activity is noted, and the treatment is then preferably discontinued while the catalyst is regenerated. Regeneration is normally accomplished by heating the catalyst at temperatures between about 600° and 1200° F. while passing dilute oxygen-containing gases therethrough to effect combustion of coke, tars, sulfur deposits and the like, which tend to deactivate the catalyst. Following regeneration, the catalyst may be reused as described above.

The feedstocks which may be treated herein comprise substantially any hydrocarbon, or mineral oil fraction of substantially any boiling range. Such mineral oil fractions may be derived from petroleum, shale oils, tar sands, coal tar or the like. The hydrocarbon fractions which are most benefited are those containing substantial proportions of sulfur, and/or nitrogen or oxygen compounds. Such feedstocks may contain for example between about 0.1% and 6% by weight of sulfur, 0.05% to 2% by weight of nitrogen, and minor proportions of other non-hydrocarbons. By the treatments described herein, 95% to 100% of the sulfur compounds may be removed, while under the same conditions about 60–90% of the nitrogen compounds are removed. Suitable mineral oil fractions include straight-run naphthas, thermally cracked naphthas, coker distillates, catalytically cracked naphthas, thermal and catalytic cracking cycle oils, virgin gas-oils, kerosene, stove oils, fuel oils, as well as fractions which may be essentially crude oils, as for example reduced crude oils.

The following example is cited to illustrate preparation and use of a typical catalyst of the present invention. This example should not however be construed as limiting in scope.

Example

*Preparation of carrier; alumina-silica.*—An alumina-silica gel containing an estimated 95% $Al_2O_3$ and 5% $SiO_2$, was prepared by the coprecipitation of an aqueous mixture of sodium aluminate and sodium silicate with carbon dioxide. The precipitate was washed until substantially free of sodium ions, dried at 90–110° C., and activated by heating for two hours at 1100° F.

*Catalyst A; alumina-silica-vanadia.*—A solution of 18 grams of ammonium metavanadate ($NH_4VO_3$) in 300 ml. of water was prepared by dissolving the salt in water at 90° C. About 270 grams of the alumina-silica carrier prepared as outlined above, in the form of ⅛″ pellets, was then immersed in the ammonium metavanadate solution. After standing for 30 minutes at 90° C. the excess solution was filtered off, and the pellets dried at 110° C., and calcined one hour at 1000° F.

The calcined pellets were then impregnated again with a fresh ammonium metavanadate solution as described above. The pellets from the second impregnation were then again dried and calcined.

Following the second impregnation, the pellets were then impregnated a third time with fresh ammonium metavanadate solution, and the thrice-impregnated catalyst again dried and calcined at 1200° F. for 12 hours. The final catalyst was found to contain 9.73% by weight of $V_2O_5$.

*Catalyst B; alumina-silica-vanadia-magnesia.*—About 40 grams of the vanadia-alumina catalyst, A, was immersed in 50 ml. of a water solution containing 8.0 grams of $Mg(NO_3)_2 \cdot 6H_2O$. After soaking a few minutes the wet pellets were drained and dried at 110° C. and calcined at 1200° F. for 16 hours. The final catalyst was found to contain 1.1% by weight of MgO, and 9.7% by weight of $V_2O_5$.

Catalysts A and B were then compared in activity for desulfurizing a catalytically cracked gasoline stock to which thiophene had been added to give a sulfur content of 1.02% by weight. The processing conditions in each case were as follows:

L.H.S.V. _____ 5.
$H_2$ oil ratio _____ 800 s.c.f./b.
Pressure _____ 50 p.s.i.g.

The results obtained at different temperatures are as follows:

| Catalyst | Desulfurization Temperature, °F. | Feed S, Wt. Percent | Product S, Wt. Percent | Product Yield, Wt. Percent |
| --- | --- | --- | --- | --- |
| A | | | | |
| 9.73% $V_2O_5$, 5% $SiO_2$, 85% $Al_2O_3$. | 707 | 1.02 | 0.82 | 88.2 |
| | 812 | 1.02 | 0.70 | 91.3 |
| | 896 | 1.02 | 0.65 | 84.8 |
| B | | | | |
| 9.7% $V_2O_5$, 5% $SiO_2$, 84% $Al_2O_3$, 1.1% MgO. | 725 | 1.02 | 0.74 | 92.8 |
| | 813 | 1.02 | 0.54 | 93.1 |
| | 906 | 1.02 | 0.45 | 89.2 |

From the above data it will be apparent that the magnesia-promoted vanadia catalyst effects a substantially greater degree of desulfurization under all temperature conditions. Also, at all temperatures tested, the yield of product was substantially higher in the case of the magnesia-promoted catalyst. Substantially the same differetnial results are obtained when other predominantly alumina carriers are employed, as for example pure alumina gel, bauxite, alumina containing 2–10% of zirconia, etc.

A favorable improvement in desulfurization activity and liquid yield is also noted when higher boiling feedstocks, e.g. gas oils, are treated under these same conditions.

It should be understood that the process conditions of the above example are not designed to exemplify those which would be employed commercially. The conditions of the example are purposely set to obtain a relatively low degree of desulfurization, in order that differential catalyst activities will be more apparent. Under commercial conditions, the pressure would preferably be raised, lower space velocities would be employed, and/or higher temperatures. Under such conditions 90–100% of the sulfur is removed from feedstocks similar to the cracked gasoline of the example, and the magnesia-promoted catalyst exhibits a similar degree of improved activity and decreased cracking tendencies, as compared to the non-promoted catalyst.

A similar catalyst containing about 1% of beryllium oxide in place of the magnesia was prepared and tested under conditions similar to the example. It was found that the beryllia-promoted catalyst showed substantially the same activity as the unpromoted vanadia-alumina catalyst. Beryllia is hence not the equivalent of magnesia as a promoter for the present catalyst.

The results of the above example were also compared with those obtained under the same conditions employing a typical, commercial cobalt molybdate-alumina catalyst containing about 3% cobalt oxide and 9% molybdenum oxide by weight. At a temperature of 712° F. the product contained 0.61% sulfur, at 826° F. the product contained 0.54% sulfur, and at 905° F. the product contained 0.43% sulfur. Hence, the magnesia-promoted vanadium oxide catalyst shows substantially the same desulfurization activity as does cobalt-molybdate on alumina.

The above examples and specific description should not be construed as limiting in scope except where indicated. Many variations may be made by those skilled in the art without departing from the spirit or scope of the following claims.

I claim:

1. A desulfurization catalyst consisting essentially of an adsorbent carrier which is essentially an activated, coprecipitated alumina-silica gel containing a minor proportion of silica, and intimately incorporated therein between about 3% and 25% by weight of vanadium oxide calculated as $V_2O_5$, and between about 0.1% and 5% by weight of magnesium oxide, wherein the atomic ratio of Mg to V is between about 0.05 and 1.0.

2. A catalyst as defined in claim 1 wherein said carrier consists essentially of activated alumina containing between about 2% and 20% by weight of coprecipitated silica gel.

3. A catalyst as defined in claim 1 prepared by first impregnating said carrier with an aqueous solution of a soluble vanadium salt followed by drying, and then impregnating with an aqueous solution of a soluble magnesium salt followed by drying and calcining.

4. A catalyst as defined in claim 1 prepared by impregnating said carrier first with an aqueous solution of a soluble magnesium salt followed by drying, and then impregnating with an aqueous solution of a soluble vanadium salt followed by drying and calcining.

5. A process for treating a hydrocarbon fraction containing non-hydrocarbon impurities selected from the group consisting of sulfur compounds, nitrogen compounds, and oxygen compounds, which comprises subjecting said hydrocarbon fraction to catalytic hydrotreating at temperatures between about 600° and 900° F., pressures between about atmospheric and 5000 p.s.i.g., space velocities between about 0.5 and 20 volumes of liquid feed per volume of catalyst per hour, and hydrogen ratios between about 50 and 5000 s.c.f. per barrel of feed, said hydrotreating being carried out in contact with a catalyst consisting essentially of (1) an adsorbent carrier which is essentially a coprecipitated activated alumina-silica gel containing a minor proportion of silica, and (2) intimately incorporated therein between about 3% and 25% by weight of vanadium oxide calculated as $V_2O_5$, and between about 0.1% and 5% by weight of magnesium oxide, wherein the atomic ratio of Mg to V is between about 0.05 and 1.0.

6. A process as defined in claim 5 wherein said hydrocarbon fraction is a mineral oil fraction boiling substantially in the gasoline range, said gasoline fraction containing between about 0.1% and 3.0% by weight of sulfur.

7. A process as defined in claim 5 wherein said carrier consists essentially of activated alumina containing between about 2% and 20% by weight of coprecipitated silica gel.

8. A process as defined in claim 5 wherein said catalyst is prepared by impregnating said carrier first with an aqueous solution of a soluble vanadium salt followed by drying, and then impregnating with an aqueous solution of a soluble magnesium salt followed by drying and calcining.

9. A process as defined in claim 5 wherein said catalyst is prepared by impregnating said carrier first with an aqueous solution of a soluble magnesium salt followed by drying, and then impregnating with an aqueous solution of a soluble vanadium salt followed by drying and calcining.

References Cited in the file of this patent

UNITED STATES PATENTS

| | | |
|---|---|---|
| 1,932,186 | Pier et al. | Oct. 24, 1933 |
| 2,209,908 | Weiss | July 30, 1940 |
| 2,270,165 | Groll et al. | Jan. 13, 1942 |
| 2,422,372 | Smith et al. | June 17, 1947 |
| 2,437,532 | Huffman | Mar. 9, 1948 |
| 2,760,906 | Arey et al. | Aug. 28, 1956 |